Dec. 6, 1960  L. L. SEYMOUR ET AL  2,963,327
SILO UNLOADERS

Filed Feb. 17, 1958  3 Sheets-Sheet 1

INVENTOR.
LYNN L. SEYMOUR
HARLOW R. POUTSCH
BY
Wheeler, Wheeler & Wheeler
ATTORNEYS

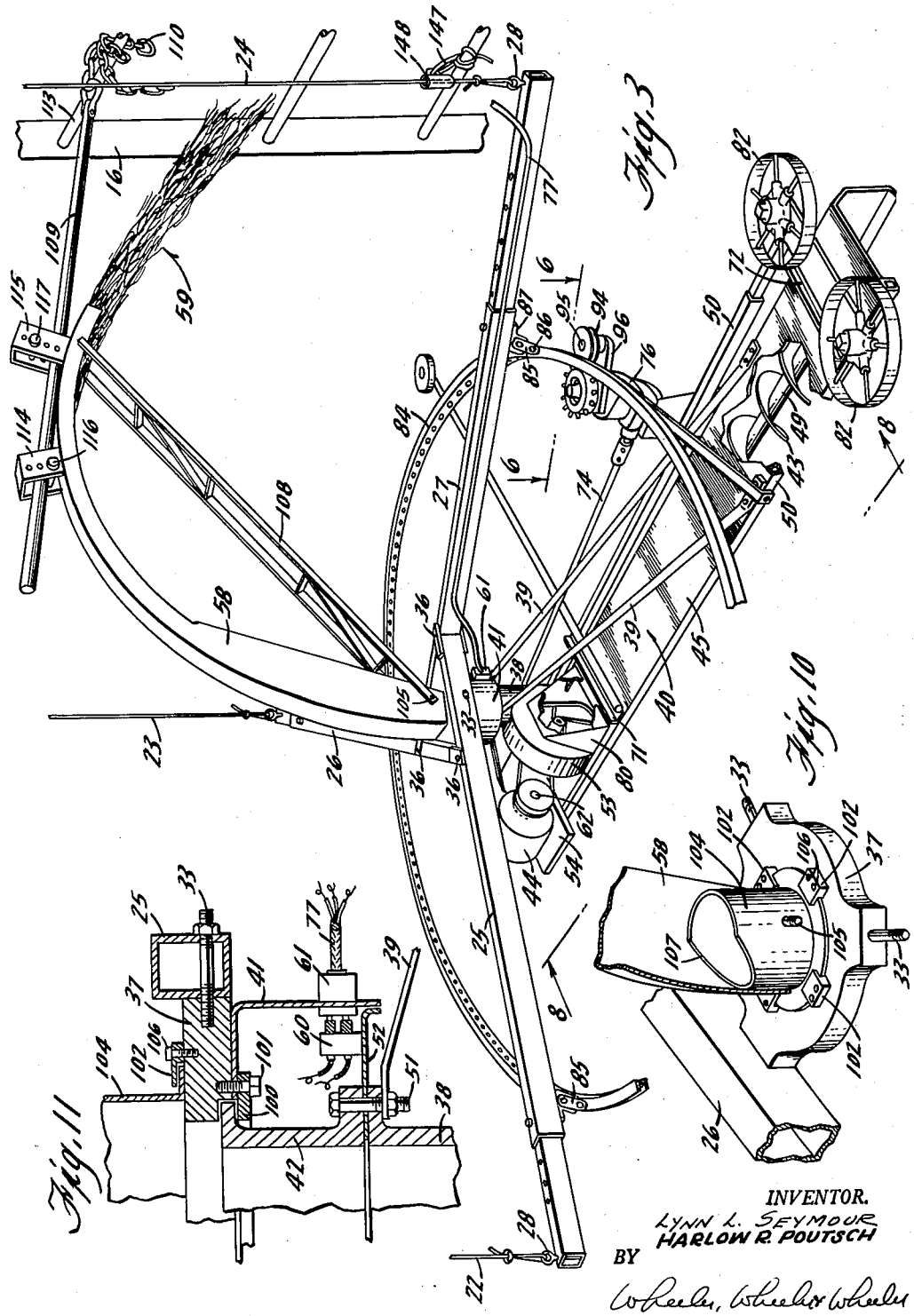

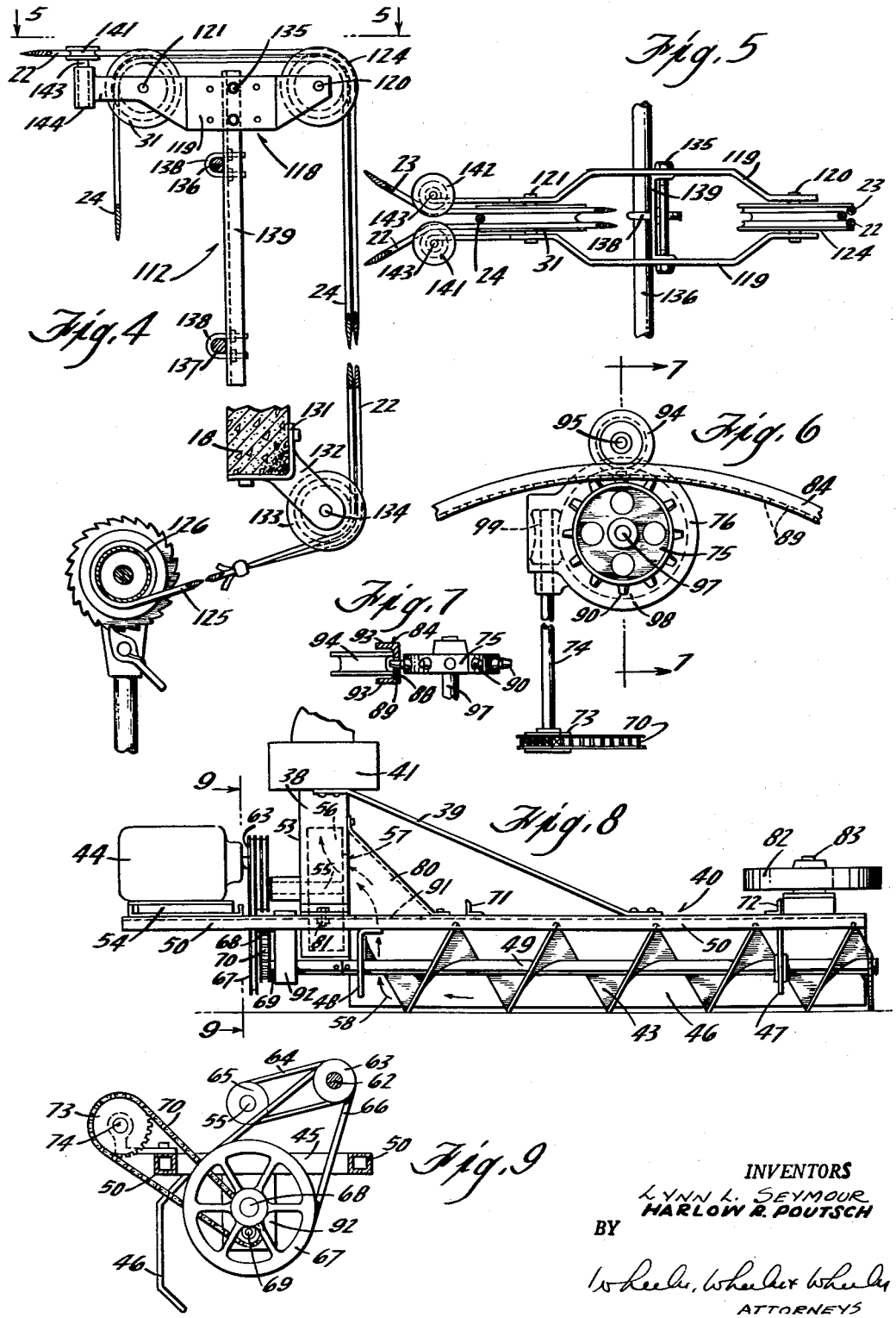

United States Patent Office 2,963,327
Patented Dec. 6, 1960

2,963,327

SILO UNLOADERS

Lynn L. Seymour and Harlow R. Poutsch, Fort Atkinson, Wis., assignors, by mesne assignments, to Rockwood & Co., Chicago, Ill., a corporation of Delaware Filed Feb. 17, 1958, Ser. No. 715,764

8 Claims. (Cl. 302—56)

This invention relates to improvement in silo unloaders.

The present invention relates to the type of silo unloader disclosed generally in United States patent to Leach et al. No. 2,580,306.

The instant invention relates to improvements in the apparatus for propelling the silage gathering means on its rotary path within the silo and specifically to a circular track in traction engagement with a drive wheel mounted on the silage gathering apparatus suspended below the track.

The instant invention also relates to improved pulley apparatus about which the cables which suspend the silo unloader from the roof of the silo are reeved, a specifically new articulate coupling between the silage discharge spout and the unloader frame, rotatable frame suspension apparatus, etc.

Other objects, features and advantages of the invention will appear from the following disclosure in which:

Figure 3 is an enlarged perspective view of a silo unloader embodying the instant invention.

Figure 4 is a fragmentary view which is somewhat diagrammatic illustrating details of the pulley assembly about which the suspension cables are reeved, a silo wall portion being shown in broken away section.

Figure 5 is a plan view taken along the line 5—5 of Figure 4.

Figure 6 is a fragmentary plan view taken along the line 6—6 of Figure 3.

Figure 7 is a fragmentary cross section taken along the line 7—7 of Figure 6.

Figure 8 is a view in side elevation of the rotatable frame which carries the silage feeding auger.

Figure 9 is a view taken along the line 9—9 of Figure 8.

Figure 10 is a perspective view showing details of the connection of the discharge chute with the frame on which the blower and unloader mechanism is suspended.

Figure 11 is a fragmentary cross section through the bearing on which the auger frame is suspended from the suspension arm frame.

Figure 1:
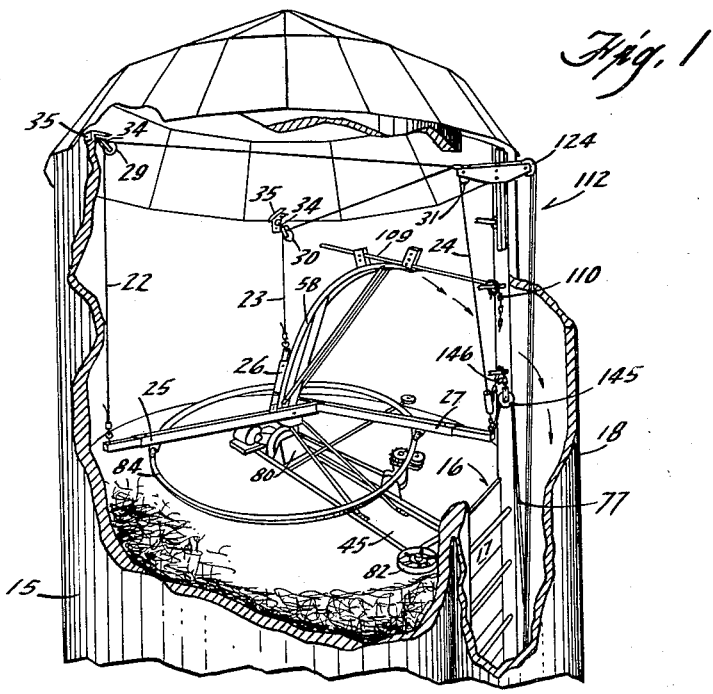
Figure 1 is a cut-away perspective view of the upper portion of a silo housing a silo unloader embodying the present invention.
Figure 2:
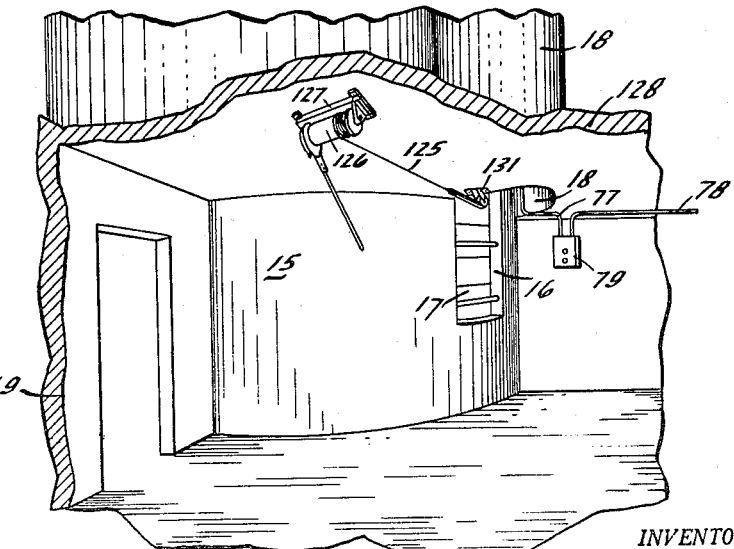
Figure 2 is a cut-away perspective view of a barn and the lower portion of the silo of Figure 1.

As best shown in Figures 1 and 2, the silo unloader is mounted in a conventional silo 15 which is provided with a vertically elongated silage discharge slot 16 which may be progressively walled by the boards 17 as the silo is filled, the boards being successively removed from the top as the silage is removed from the silo. The silage is thrown down through the chute 18 which encloses a space adjacent the slot 16. As shown in Figure 2, the chute 18 communicates with a space in the barn 19 adjacent to the silo 15.

As in the patent to Leach aforesaid, the silo unloader of the present invention is suspended from the top of the silo on cables 22, 23, 24. The silo unloader comprises a frame consisting of arms 25, 26, 27 which are interconnected by bolts 36 at the center of the silo and extend substantially radially outwardly toward the silo wall. The arms 25, 26, 27 form a central polygonal frame in which bearing support 37 is mounted as hereinafter described and on which the rotatable frame 40 is suspended.

The arms 25, 26, 27 are desirably telescopic for extension outwardly to fit within silos having different diameters and also to facilitate alignment of the tie bolts 28 at the ends of the arms and to which the cables 22, 23, 24 are connected with the pulleys 29, 30, 31 over which the cables 22, 23, 24 are reeved.

The respective pulleys 29, 30 may simply be connected on links 34 to U-shaped hangers 35 which engage over the upper rim of the wall of the silo 15. Pulley 31, however, is part of a bracket assembly best shown in Figures 4 and 5 and which will be hereinafter described in greater detail.

The respective arms 25, 26, 27 of the silo unloader frame are interconnected by bolts 36 in a triangular pattern and to the bearing support hub 37 which has flat bosses 32 with extending threaded studs 33 fastened to the arms 25, 26, 27 as is best shown in Figures 3, 10 and 11. The bearing support 37 carries on annular ring 100 fastened thereto by bolts 101 a bearing member 42 within cover 41 to which the impeller discharge spout 38 is fastened. Bearing member 42 is also connected by means of the bracket rods 39 to the frame 40 on which the auger 43 and motor 44 are rotatably suspended from the frame 25, 26, 27. Clamped between corresponding flanges of bearing member 42 and spout 38 by bolts 51 is a support plate 52 on which slip ring assembly 60 is mounted. The slip rings co-operate with brush assembly 61 to conduct electric power from cable 77 to the motor 44.

As best shown in Figures 3, 8 and 9, the frame 40 comprises laterally spaced box beams 50, a cover plate 45 having integrally therewith a downwardly extending conveyor apron 46 at the trailing margin of the plate 45, cross angle members 71, 72 which fasten the plate and apron to the beams 50, and brackets 47, 48 on which the shaft 49 for the auger 43 is mounted for rotation. Beams 50 are extended rearwardly beyond their connection to the blower housing 53 on bolts 81 (Fig. 8) to support a cross platform 54 on which the motor 44 is mounted. The blower housing 53 contains an air impelling fan 56 aligned with the eye 57 of the housing 53 and through which silage conveyed by the auger 43 will be conveyed pneumatically along the path of the arrows 58 from the discharge end of the auger 43 into the eye of the blower through a hood 80 mounted on the blower housing 53 and cover plate 45 and disposed over opening 91 in the cover plate 45 and thence upwardly through the spout 38, hollow bearing member 42, discharge chute 58 and into the discharge chute 18 of the silo. The pneumatically conveyed silage is identified diagrammatically in Figure 3 by reference character 59.

The motor 44 is connected on its shaft 62 to multiple sheave pulley 63 and thence by belt 64 from pulley 63 to pulley 65 on the blower impeller shaft 55. Belt 66 extends from pulley 62 to the pulley wheel 67 which is on a jack shaft 68 interconnected through speed reduction gears in transmission housing 92 with auger shaft 49. The auger shaft 49 has at its end a sprocket 69 for the chain 70 which drives sprocket 73 on shaft 74 which drives through additional speed reduction gearing in the transmission housing 76 the toothed sprocket wheel 75.

Power is supplied to the motor 44 through the brush and slip ring assembly 60, 61 shown in Figure 11 from power cable 77 which is connected from a source of supply 78 through a control switch 79 shown in Figure 2.

The end of the subframe 40 remote from blower housing 53 is provided with dual wheels 82 mounted on vertically disposed axles 83 for rolling contact with the side wall of the silo 15.

The subframe 40 is made to slowly rotate in a horizontal plane about the center of the silo by reason of traction developed between the driven toothed sprocket wheel 75 and the circular drive track or rack 84 which is supended from the frame arms 25—27 on the coupling links 85 which are articulate on the pivot pins 86 suspended from anchor brackets 87 secured to the under surface of the arms 25—27.

As best shown in Figure 7, the rack 84 is channel-shaped and has upper and lower horizontal flanges 93 and a vertical web 88 provided with circumferentially spaced holes 89 with which the teeth 90 of the sprocket wheel 75 mesh. Spaced from the sprocket wheel 75 at the opposite side of channel web 88 is a back-up roller 94 which keeps the teeth of the sprocket in mesh with the rack 84. Back-up roller 94 is mounted on a vertical jack shaft 95 extending upwardly from arm 96 which extends laterally from the transmission housing 76.

The drive sprocket 75 has a vertical shaft 97, the lower end of which is provided with a gear 98 (Fig. 6) within the housing 76 and which meshes with a worm 99 at the end of drive shaft 74.

The speed reduction gearing between the motor 44 and the sprocket 75 is such as to rotate the sprocket 75 very slowly. Under usual conditions of operation, the sprocket 75 will drive the subframe 40 around the silo about once every fifteen minutes.

As best shown in Figures 10 and 11, the upper surface of the bearing support hub 37 is provided with spaced clamp clips 102 which releasably retain the flange 103 of the chute support base 104. The base is provided with pivot pins 105 on which the discharge chute 58 is free for limited articulation. The discharge chute base 104 can be rotated for alignment of the chute 58 with silo slot 16 and can be removed completely from the frame simply by loosening bolts 106 to manipulate the clips 102.

The base 104 includes a pipe portion which is circular in cross section but which has its upper portion cut away as shown at 107 in Figure 10, to avoid interference with pivotal movement of the chute 58. Chute 58 is enlarged somewhat near its lower end and is generally U-shaped in cross section and is open at its lower side. The centrifugal force of the pneumatic stream of silage 59 which traverses the curve of the discharge chute will hold the silage in the chute until it is released at the end thereof.

The upper end of the chute 58 is supported by a bar 109 which has its free end fastened by chain 110 to an appropriately located rung 113 on the ladder which spans the slot 16 in the silo wall. The chute 58 is provided with two upstanding U-shaped brackets 114—115. Bracket 114 has a transverse roller 116 below the rod 109 and the bracket 105 has a transverse roller above the rod 109. The upper end of chute 58 is further supported by brace 108 fastened to the lower end of the chute on pivot pins 105.

As the silo unloader descends in the silo, the chute 58 will pivot inwardly about its pivot pins 105 and will tend to straighten up. Rollers 116, 117 will roll along the rod 109 to accommodate this movement. Accordingly, the chute will adjust itself to changes in the level at which the silo unloader rides. After the unloader has descended for a few feet, however, it will be necessary for the farmer to transfer the chain 110 to a lower rung 113.

As best shown in Figures 1, 4 and 5, the three support cables 22, 23, 24 are reeved over a series of pulleys supported on the cross arm 118 of a pulley bracket assembly 112. The cross arm comprises spaced plates 119 having cross pintles 120, 121 mounting triple-grooved pulleys 31, 124 over which the cables 22, 23, 24 are reeved. As aforestated, pulley 31 is substantially directly above the eye bolt 28 at the end of frame arm 27. Pulley 124, however, projects beyond the wall of the silo 15 into alignment with the discharge chute 18. All three cables 22, 23, 24 lead downwardly through the chute 18 and are connected at their lower ends to a single cable 125 which is wound upon the drum 126 mounted on the bracket 127 to the under surface of barn ceiling 128.

The chute wall 18 is desirably provided at its lower edge with an angle bracket 131 having an arm 132 on which triple grooved pulley 133 is pivotally supported on the pintle 134.

The plates 119 of the bracket cross arm 118 are secured by bolts 135 to channel-shaped bracket support 139 which lies between the plates and which desirably is secured to the two top rungs 136, 137 of the silo by means of the U-bolts 138.

As best shown in Figures 1 and 5, the cables 22, 23 converge from their pulleys 29, 30 toward guide pulleys 141, 142 which are supported on upright shafts 143 journaled in bearing bosses 144 formed at the ends of plates 119. Guide pulleys 141, 142 align the cables 22, 23 with the appropriate grooves on pulleys 31, 124. Cable 24, of course, leads directly down from the center groove of pulley 31 to the eye bolt 28 on frame arm 27.

Electric power cable 77 is reeved over pulley 145 which is fastened by means of tie cord 146 or the like to one of the rungs 113 in the silo slot.

If desired, I may optionally tie cable 24 to one of the rungs 113 by means of cord 147. The cord 147 is attached to a sleeve 148 through which the cable 24 may slip.

We claim:

1. A silo unloader comprising a frame, means for suspending the frame in the silo, silage gathering means suspended from said frame for rotation with respect to said frame and about the center of the silo in a substantially horizontal plane, a circular track, means suspending said track in said silo to be substantially non-rotatable with respect to the silo and yieldable connections between said track and frame whereby the track is free for limited movement with respect to the frame, a drive wheel connected to said silage gathering means and in traction engagement with the track, and means for rotating the drive wheel along said track to propel the gathering means on its path of rotation in said silo.

2. The device of claim 1 in further combination with a back-up wheel at the opposite side of the track from the wheel first mentioned and connected to said silage gathering means.

3. The device of claim 1 in which said track comprises a rack having laterally open sprocket holes, said drive wheel comprising a sprocket mounted for rotation about a vertical axis and having teeth meshing with the rack.

4. The device of claim 1 in which said frame comprises radial arms, said yieldable connections comprising articulate couplings suspended from said arms.

5. A support frame for a silo unloader and comprising a bearing plate, a plurality of arms mutually interconnected to each other and to the side of the plate, corresponding ends of each arm being connected to corresponding intermediate points on next succeeding arms, to form a polygonal frame for the plate bounded by said intermediate points, said arms being extended beyond said frame and toward the silo wall in a substantially radial direction, and means substantially at the ends of said arms for suspending the frame in the silo.

6. The combination with a silo having a vertical silage discharge slot, a silo unloader having a frame, means suspending the frame in the silo for vertical movement therein and for relative rotation with respect to said slot said frame comprising a bearing plate, a blower suspended from said plate and a discharge chute projecting upwardly from the top of said plate and inclined toward said slot to project silage therethrough, and means rotatably connecting said chute to said plate for alignment of the chute with the slot.

7. The device of claim 6 in which the last mentioned means comprises clips releasably attached to the plate, said chute having a base portion having an annular flange engaged beneath said clips.

8. The device of claim 1 in which said frame comprises a bearing plate, a plurality of arms mutually interconnected to each other and to the side of the plate, corresponding ends of each arm being connected to corresponding intermediate points on next succeeding arms, to form a polygonal frame for the plate bounded by said intermediate points, said arms being extended beyond said frame and toward the silo wall in a substantially radial direction, a blower suspended from said bearing plate and a discharge chute projecting upwardly from the top of said plate and means rotatably connecting said chute to said plate.

References Cited in the file of this patent

UNITED STATES PATENTS

| | | |
|---|---|---|
| 1,479,990 | Keys | Jan. 8, 1924 |
| 2,580,306 | Leach et al. | Dec. 25, 1951 |
| 2,595,333 | Clapp | May 6, 1952 |
| 2,663,594 | Dennick | Dec. 22, 1953 |
| 2,677,474 | Long | May 4, 1954 |
| 2,678,241 | Miller | May 11, 1954 |
| 2,719,058 | Van Dusen | Sept. 27, 1955 |
| 2,794,560 | Buschbom | June 4, 1957 |
| 2,801,137 | Clay | July 30, 1957 |
| 2,801,885 | Harris | Aug. 6, 1957 |
| 2,877,907 | Buschbom | Mar. 17, 1959 |